United States Patent

Wild

[15] 3,683,285
[45] Aug. 8, 1972

[54] METHOD OF AND APPARATUS FOR DETERMINING THE DIFFERENCE IN PHASE BETWEEN TWO PERIODIC ELECTRICAL SIGNALS HAVING ESSENTIALLY THE SAME FREQUENCY

[72] Inventor: Peter J. Wild, Wettingen, Switzerland

[73] Assignee: Aktiengesellschaft Brown, Boveri & Cie, Baden, Switzerland

[22] Filed: Jan. 28, 1971

[21] Appl. No.: 110,552

[30] Foreign Application Priority Data

Feb. 5, 1970 Switzerland............1643/70

[52] U.S. Cl. ..................328/133, 328/44, 328/127, 328/151
[51] Int. Cl. .............................................H03d 13/00
[58] Field of Search........328/133, 134, 141, 155, 44, 328/127, 151; 307/232, 233

[56] References Cited

UNITED STATES PATENTS

| | | | |
|---|---|---|---|
| 3,219,935 | 11/1965 | Katakami | 328/134 X |
| 3,235,800 | 2/1966 | Turrell | 328/134 X |
| 3,328,688 | 6/1967 | Brooks | 328/133 X |
| 3,382,376 | 5/1968 | Sowden | 328/133 X |
| 3,391,343 | 7/1968 | McCurdy | 328/133 |
| 3,521,173 | 7/1970 | Farley | 328/134 |

Primary Examiner—John S. Heyman
Attorney—Pierce, Scheffler & Parker

[57] ABSTRACT

A method for determining the phase shift between two periodic signals having essentially the 1"as a first 0"the two signals into corresponding rectangular voltage waveforms. The interval between homologous edges of the two rectangular waveforms corresponding to the phase difference is converted into a pulse-duration-modulated rectangular signal which is fed to an integrate-and-hold circuit which produces at its output an amplitude-modulated signal proportional to the phase difference that is held for a certain period of time following completion of the integration. A sampling command furnished by a sequence control unit is fed to a sample-and-hold circuit which permits transfer to it of the signal from the output of the integrate circuit. Ahead of the sampling command, the sequence control unit generates a comparison command to a transient detector having a voltage threshold with which there is compared an "old" value of the amplitude-modulated signal corresponding to the last phase difference stored in the sample-and-hold circuit and a "new" value corresponding to the present phase difference at the output of the integrate circuit so that exceeding the threshold level of the detector serves as a criterion for determining a voltage transient corresponding to a $2\pi$-transition. Depending upon the result of the comparison, logic "1" or "0" signals appear at the outputs of the transient detector which are then fed to, and added in, a reversible counter which thus keeps track of the algebraic sum of the integer $2\pi$-transitions.

8 Claims, 10 Drawing Figures

METHOD OF AND APPARATUS FOR DETERMINING THE DIFFERENCE IN PHASE BETWEEN TWO PERIODIC ELECTRICAL SIGNALS HAVING ESSENTIALLY THE SAME FREQUENCY

This invention relates to a method of and apparatus for the unambiguous determination of the phase shift $\Delta\phi$ between two periodic signals which are alike, or substantially alike in frequency, with detection and algebraic summation of the transitions through integer multiples of $2\pi$, in which method the input signals are converted, by amplification and limitation, into rectangular voltage waveforms, and the time interval between homologous transients of these rectangular signals serves as a measure of the particular phase shift, and the discontinuities occurring in the duration of these rectangular signals on $2\pi$-transitions of the phase shift cause the generation of characteristic signals defining the direction of the particular $2\pi$-transition, which signals are added algebraically and stored in a reversible counter.

Phase measuring methods which are based essentially on this principle have already been proposed. The article "High-speed digital phasemeter" in "Electronic Engineering", of April, 1968, pages 206-212, describes a digital phasemeter for determining phase shifts of several times (up to 15 times) $2\pi$. In this case, a time comparison method is used wherein the phase information is supplied to the two input channels through a plurality of delay pairs in order to be able to extend the measuring range to more than $2\pi$ (see FIG. 3 of the reference noted above). Only after passing these delays the phase difference of the resulting signals becomes converted into a pulse-duration modulated signal. If the pairs of delays are not precisely matched, a measuring error is introduced. In addition, the output signal from the digital/analog converter driven by the reversible counter is pulse-duration modulated. Amplitude averaging for the analog display is done by means of a low-pass filter. A bank of capacitors is connected depending on the repetition frequency of the input signals of the phasemeter. The delay of phase measurement is increased by this filter.

It is the objective of the invention to provide a phase-measuring technique which results in a particularly short measuring delay in comparison with the prior art, even when detecting multiples of $2\pi$, and which does not rely on any timing elements which might cause measuring errors in the phase-sensitive channels.

The phase-measuring method according to the invention is characterized in that, by means of an integrate and hold circuit a pulse-duration/pulse-amplitude conversion and temporary storage of the resulting amplitude-modulated signal in the storage section of this circuit is achieved, and in case the duration of the pulse-duration modulated signals exceeds a certain critical minimal time corresponding to a minimal phase difference, which minimal time is defined arbitrarily depending on reliable detection of $2\pi$ transitions and in the limiting case may approach zero, the following steps are initiated;

a. delayed transfer and storage of the amplitude-modulated signals appearing at the output of the integrate circuit, by means of a sample and hold circuit, b. ahead of each transfer, amplitude comparison between the new measured value at the output of the integrate circuit and the old measured value at the output of the sample and hold circuit by means of a voltage-transient detector with voltage threshold, with which the magnitude of the amplitude differences is compared, so that exceeding this threshold serves as a criterion for determining a voltage-transient corresponding to a $2\pi$-transition, c. if an amplitude transient corresponding to a $2\pi$-transition is detected by the transient detector, a signal on one of the outputs of the transient detector is generated depending on the sign of the amplitude difference, which signal is fed to the appropriate input of the reversible counter and is counted with the correct sign.

In this method, therefore, on the one hand direct access to the last measured remainder of a division of the whole phase shift extending over a multitude of $2\pi$ divided by $2\pi$ at the output of the sample and hold circuit in the form of a phase-proportional voltage is possible; on the other hand, the algebraic sum of the integer number of $2\pi$-transitions is stored in the reversible counter and can be represented directly in digital form. Finally, as a result of the detection of said minimal time, care is taken to ensure that no information regarding a voltage-transient is lost or grossly distorted for very small phase variations close to a $2\pi$-transition, as discussed in more detail later.

The invention will now be explained in more detail with reference to the accompanying drawings wherein.

Figure 1:
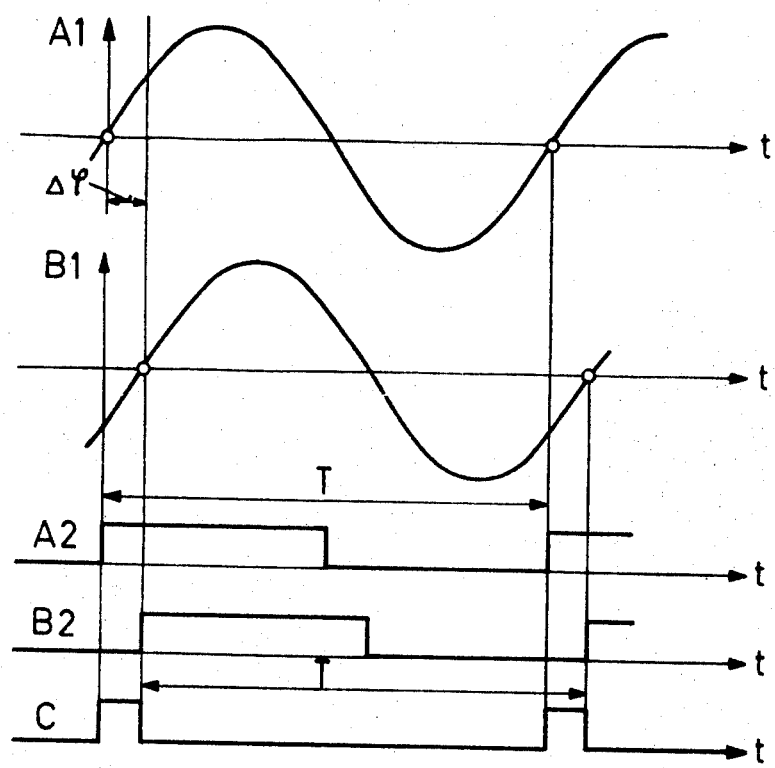
FIGS. 1 and 3 show the time diagram of voltage waveforms to illustrate the generation of the pulse-duration-modulated rectangular signals from the phase-shifted waveforms.
Figure 2:
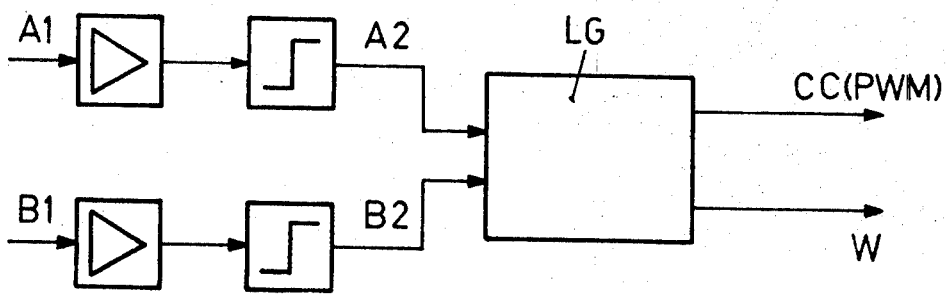
FIG. 2 shows the block diagram of a system to achieve the signals of FIGS. 1 and 3.

In the time diagram of FIG. 1, $A_1$ and $B_1$ represent the two phase-shifted signals, and $\Delta\phi$ is the phase difference. $A_2$ and $B_2$ are the rectangular waveforms derived therefrom by amplification and limitation (see FIG. 2). The interval between homologous edges, for example, the leading edges, corresponds to the phase difference $\Delta\phi(\Delta t=\Delta\phi/\omega)$. This interval is converted into a pulse-duration-modulated (PWM) rectangular signal C or CC of corresponding duration by means of bistable elements in the logic LG (see FIG. 2), the difference between C and CC is explained later.

Figure 3:
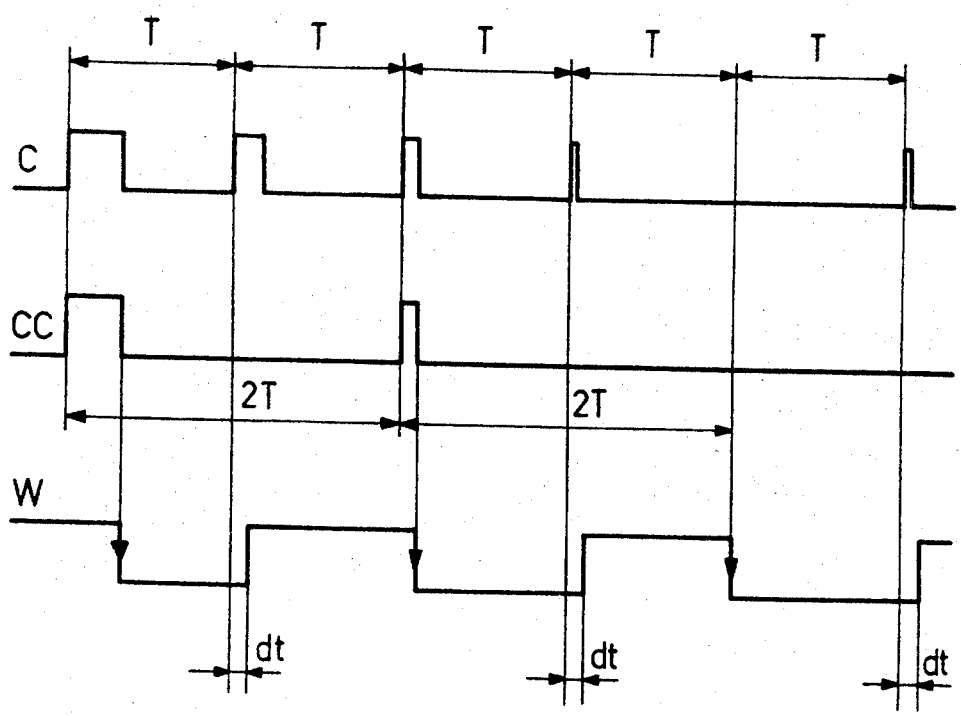

The generation of pulse-duration-modulated signals C is seen in FIG. 1. FIG. 3 shows, as a first line, the pulse train C (spacing of the leading edges equals a signal period T in each case), and as a second line the pulse train CC. CC is formed by every other pulse of C so that the spacing of leading edges of CC is normally equal to 2T. The logic LG (FIG. 2) is so structured that it generates, at one of its two outputs, the pulse-duration-modulated signal CC and a rectangular pulse W at the second output. W is initiated by each zero-crossing of $A_1$ that should trigger a pulse C but not a pulse CC, after a delay $dt$, each zero-crossing of $B_1$ that triggers a pulse end of C and CC should also cause a pulse end of W even if the separation of homologous edges of $A_2$ and $B_2$ is too short to allow any signals C and CC to be generated. For very small phase difference $\Delta\phi 5$ it may happen that pulse C as well as CC are absent although the corresponding zero-crossings of $A_1$ and $B_1$ exist (the absence is given by the finite switching times of the logic LG). This case is shown in FIG. 3, first and second lines, penultimate period. Pulse W should also be generated in this case, as defined. The constant delay $dt$ ensures that the duty cycle of W does not become too high. If no zero-crossing of $B_1$ terminates the initiated pulse CC within a period T of $A_1$, the next triggering of C (FIG. 3) ensures in the logic LG that the pulse duration of CC does not exceed T.

Figure 5:
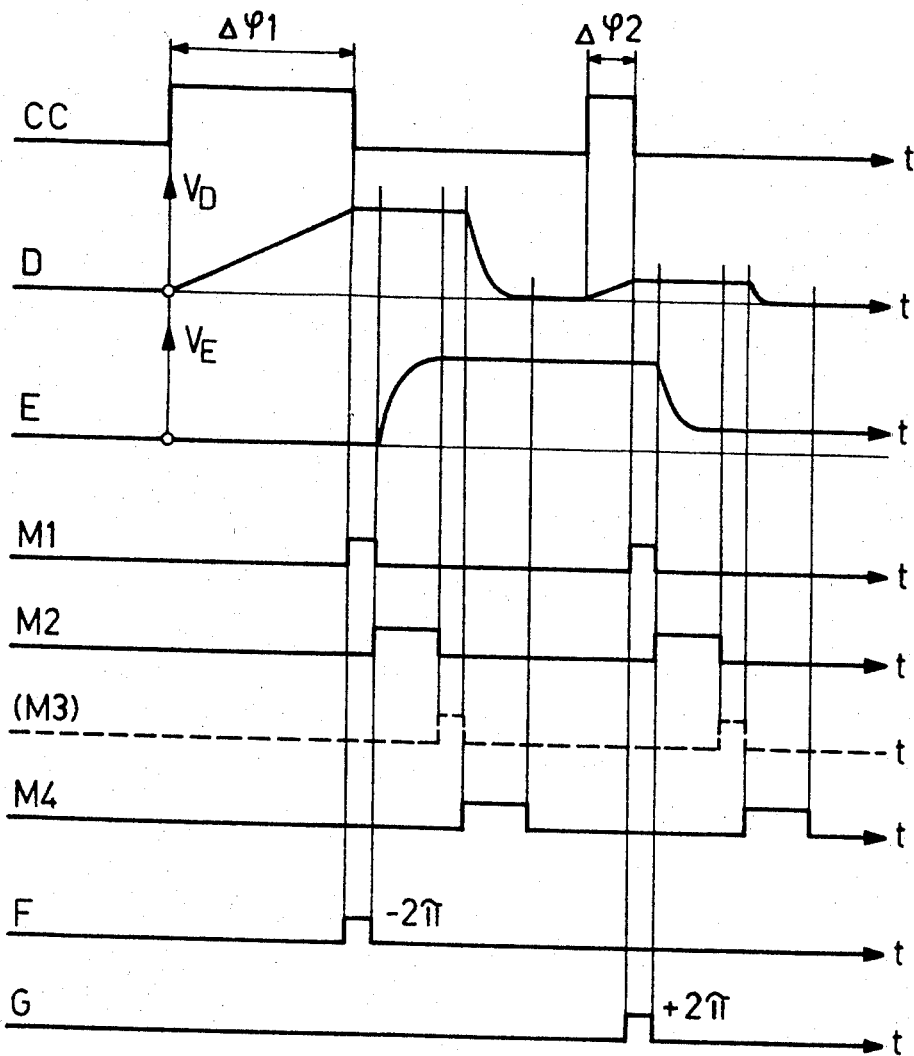
FIG. 5 is a time diagram to explain the sequence of operations of the configuration shown in FIG. 4.
Figure 4:
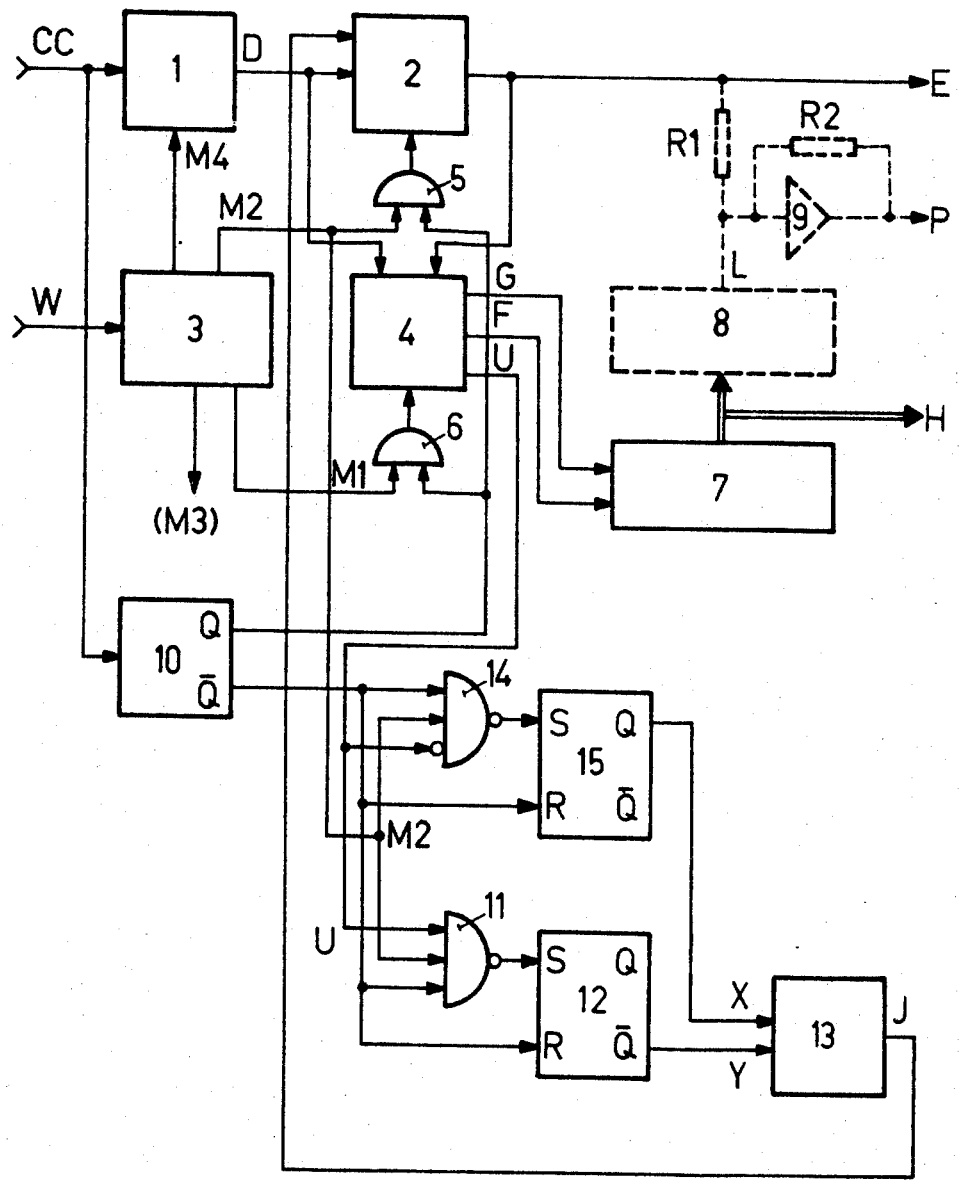
FIG. 4 shows a logic diagram of a configuration for carrying out the method according to the invention.

FIG. 4 shows schematically a configuration for carrying out the phase-measuring method according to the invention. The signal CC is fed to the input of the integrate and hold circuit 1, whose output D provides the amplitude-modulated signal $V_D$ which is held for a certain period of time after the integration has been completed (see FIG. 5 second line). A sequence control unit 3 (FIG. 4), which might consist of a series of trailing edge triggered monostable multivibrators, controls the operations taking place in succession. The signal $M_2$ is a sampling command; it is fed to the sample and hold circuit 2 and allows (see FIG. 5) the transfer of the signal $V_D$ appearing at the output D of 1, by means of the sample and hold circuit 2. Ahead of the sampling command the sequence control unit 3 generates a comparison command $M_1$ to the transient detector 4; it causes the comparison of the 'old' value of the amplitude-modulated signal $V_E$ proportional to the last phase difference which is stored in 2 and appears at its output E after it was transferred from 1, with the 'new' value $V_D$ proportional to the present phase difference at the output D of 1 in the transient detector 4. Depending on the result of the comparison in the transient detector 4 (no voltage transient, voltage transient in one direction or the other) either logical '0' signals appear at the outputs F and G of 4, or a logical '1' signal at F or G respectively (depending on the sign); the latter signals are fed to the reversible counter 7 and added there with the correct sign (incrementing or decrementing input). Counter 7 therefore always keeps track of the algebraic sum of the integer $2\pi$-transitions. The remainder of the division 'entire phase variation divided by $2\pi$' is available simultaneously in analog form at the output E of 2. After a waiting time ($M_3$), the signal $M_4$ (reset command) ensures the resetting of the integrating circuit 1 to voltage zero, whereupon 1 is again available for processing the next pulse CC. The waiting time $M_3$ is necessary for correct operation. The pulse $M_3$ does not have to be generated separately, if $M_4$ follows $M_2$ with the necessary delay.

Initiation of the sampling command $M_2$ and of the comparison command $M_1$ is generally only conditional (see AND circuits 5 and 6 in FIG. 4); it is controlled by unit 10 and may be omitted, as already mentioned above, if the pulse duration of CC depending on the phase difference $\Delta\phi$ remains below an arbitrarily determined, critical minimal value. This will be discussed in more detail later.

The command sequence $M_1$ to $M_4$ is initiated by the trailing edge of pulse W in the sequence control unit 3. This pulse W generated as explained above is not shown in FIG. 5.

Figure 6:
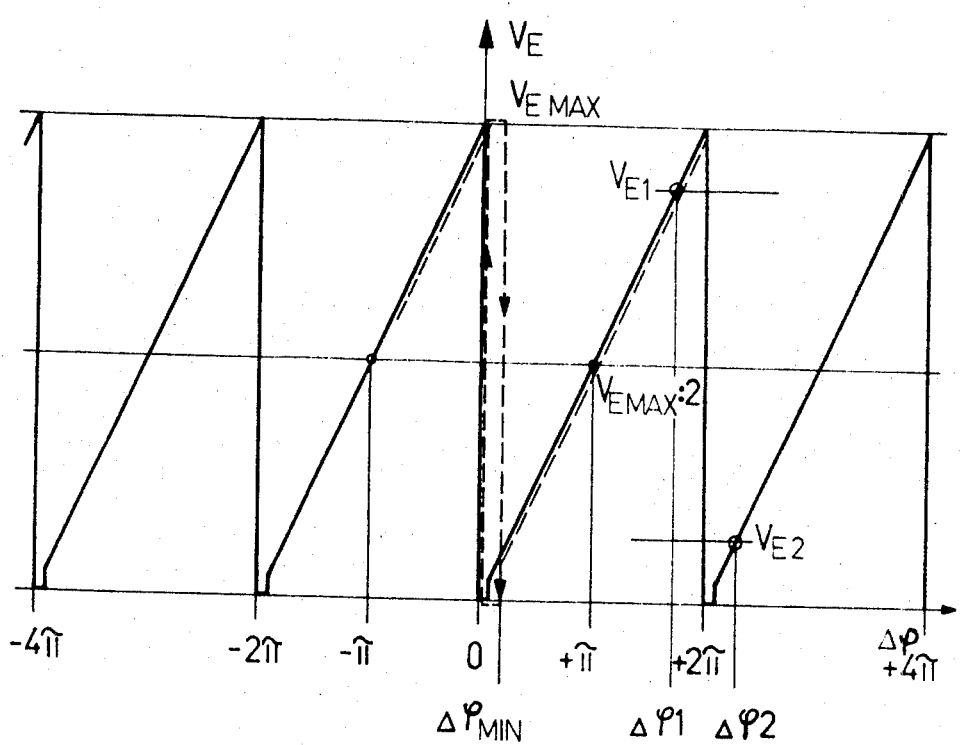
FIG. 6 shows the division-remainder measuring characteristic (output voltage $V_E$ as a function of phase difference) of the configuration according to FIG. 4.

Let it be assumed first that $\Delta\phi$ and the pulse width of CC respectively is hypercritical, that is to say, opening of the AND gates 5 and 6 (FIG. 4) is made possible by an 1-signal at the output Q of 10. FIG. 6 shows the measuring characteristic of the system formed by the units 1, 2 and 3. If the range of $2\pi$ is exceeded, there is a voltage transient at the outputs D and E (only the solid line characteristic of FIG. 6 is being considered first). FIG. 6 corresponds to FIG. 1. In FIG. 1, however, the signal C could be obtained by other combinations of $A_2$ and $B_2$. One of these combinations allows the origin of FIG. 6 to be shifted by $\pi$ for example. As long as the sawtooth characteristic of FIG. 6 is only shifted along the axis of the abscissa, the method described below is applicable.

Let the last measurement result by $V_E = V_{E1}$ at the output E corresponding to $\Delta\phi_1$ (FIG. 6). The voltage $V_{E1}$ is stored in 2 (FIG. 4). If the phase difference increases to $\Delta\phi_2$ before the next measurement cycle a voltage of value $V_D = V_{E2}$ will appear at the output D. If the voltages at outputs D and E are compared at the correct time ($M_1$, FIG. 5), the voltage transient which has occurred between the two measuring cycles can be detected. The operation of the transient detector serving this purpose is defined by the following equations:

$$F = M_1 \,\&\, (V_D - V_E) > K$$

$$G = M_1 \,\&\, (V_E - V_D) > K$$

$$K = V_{MAX}/2 = V_{EMAX}/2$$

This implies the introduction of a critical threshold for the voltage difference $V_D - V_E$. This threshold $K$ is appropriately made equal to half the maximal voltage corresponding to $\Delta\phi = 2\pi$ (see FIG. 6) appearing at the output D of 1 or at the output E of 2 for a given frequency of the input signals. If the difference between $V_D$ and $V_E$ (considered in magnitude only) is greater than this threshold value $K = V_{DMAX}/2 = V_{EMAX}/2$ a voltage transient is detected and counted.

If $V_D - V_E$ is positive during the interval $M_1$ and greater than K, a pulse is generated at the output F of 4 indicating that a positive voltage transient has taken place. If the difference $V_D - V_E$ is negative, on the other hand, during the interval $M_1$ and is greater in magnitude than K, a pulse appears at the output G of 4 indicating that there has been a negative voltage transient.

If the difference $V_D - V_E$, considered in magnitude only, remains below the critical threshold value $K$, then no pulses appear at the outputs F and G of 4, and no voltage transient is detected and counted.

The mode of operation of detector 4 is dependent on the rate of variation of phase shift. The maximal allowable variation in phase difference between successive measuring intervals (trailing edges of CC) is $\pi$. If a larger variation occurs, it can be misinterpreted as a voltage transient although happening in the continuous range of the measuring characteristic (see FIG. 6) On the other hand, an actual transition through a discontinuity of the characteristic in FIG. 6 may escape detection if the above-mentioned limit is exceeded and if at the same time:

$$|V_D - V_E| < (V_{EMAX} : 2) \quad \text{holds.}$$

The reversible counter in FIG. 4 accumulates the pulses from outputs F and G. A pulse F indicates a phase increment of $-2\pi$, a pulse G an increment of $+2\pi$. The count represents the phase difference in units of $2\pi$. The number of counting stages determines the maximal phase variation which can be kept track of. If the maximal range has to be $\pm n(2\pi)$, the counter must be able to count to $2n$.

According to the description so far, the output of the phase measuring configuration illustrated in FIG. 4 consists of an analog signal $V_E$ at E and a digital number at H (accumulated count of 7). The digital output indicates the integer multiples of $2\pi$ of the phase difference $\Delta\phi$ while the voltage $V_E$ corresponds to the remainder of the division $\Delta\phi : 2\pi$. The accuracy of the indicated result is determined by the remainder signal E. For measured values which reach a high multiple of $2\pi$, the accuracy is very high with respect to the measured value $\Delta\phi$. The maximal measuring range for $\Delta\phi$ is essentially limited only by the maximal allowable rate of change in phase and the dimensioning of counter 7.

FIG. 4 shows (in broken lines) another possibility of representing the output. The count H is converted by a digital-analog converter 8 into a proportional current which flows into point L. L is, at the same time, the input of an operational amplifier 9 with negative feedback $R_2$. As a result, L acts as virtual ground. $R_1$ is chosen so that for maximal voltage $V_{EMAX}$ at the output E, the current passing through $R_1$ is equal to the current which results from one counting unit of the reversible counter 7 controlling the digital-analog converter 8.

The output section of FIG. 4 (shown in broken lines) permits the combination of signals E and H in a purely analog signal P. If the output P is used, however, the obtainable accuracy depends on the maximal $\Delta\phi$ to be processed. If $\Delta\phi_{MAX}$ is a high multiple of $2\pi$, then measurements with $\Delta\phi << \Delta\phi_{MAX}$ are less accurate than with the hybrid method described before (analog output at E, digital output at H).

The configuration in FIG. 4 can also be used to determine only the multiple of $2\pi$ of the phase difference. Since the output E then no longer serves the purpose of representing the remainder of the division $\Delta\phi : 2\pi$ as accurately as possible, the requirements regarding the integrate circuit 1 and the sample and hold circuit 2 can be lowered. The remainder of the division $\Delta\phi : 2\pi$ may, for example, be determined separately by digital time interval measurement (counting clock pulses of high repetition rate for the duration of the pulse-duration-modulated signals CC). Thus a purely digital representation of the phase difference can be realized up to $n \cdot 2\pi$.

With the method of generating pulses CC as in FIG. 1, the pulse width may reach a full period T of the input signals. In order that the command sequence $M_1$, $M_2$ (possible $M_3$) and $M_4$ can still be generated between two measurements, only every other period of the input signals is fed to the measuring section for the sake of simplicity. This is achieved by generating pulses CC and W of the configuration in FIG. 4 only during every other cycle of the input signals.

It would, however, be possible to expand the configuration shown in FIG. 4 further so that a complete measurement would be carried out during each period of the input signals. Two different integrate and hold circuits could be fed alternately with pulses C and their outputs could be combined by a sample and hold circuit whose two inputs would be activated alternately. In this case, a modification of the voltage transient detector 4 would naturally be necessary was well. As a result of this modification, it would be possible to ensure that the measuring repetition frequency would be doubled so that maximal allowable phase variations of magnitude $\pi$ could happen twice as frequently (see above).

In the description hitherto of the mode of operation of the circuit configuration shown in FIG. 4, it is assumed that $\Delta\phi$, or the pulse width of CC proportional to $\Delta\phi$, was hypercritical, i.e. that $\Delta\phi$ was greater than an arbitrarily determined minimal phase difference $\Delta\phi_{MIN}$ and the pulse width of CC was greater than the associated minimal time $\Delta\phi_{MIN}/\omega$.

With regard to the introduction of such a critical minimal value, it may be noted that, for phase differences with very small variation in phase about a transition point as shown in FIG. 6, ambiguity may arise in detecting multiples of $2\pi$ as a result of frequency fluctuations at the inputs.

In order to eliminate this ambiguity, said minimal value $\Delta\phi_{MIN}$ of phase difference is determined, so that if this limit is exceeded, well defined amplitudes result in all cases and permit an unambiguous transient detection. The introduction of this means causes an artificial hysteresis (see broken line sections of curve, FIG. 6) in the measuring characteristic. If $\Delta\phi$ remains less than $\Delta\phi_{MIN}$ the risk of errors in counting the $2\pi$-transitions exists if the sample and comparison method hitherto described is retained. Therefore, in the case of sub-critical values of $\Delta\phi$, or of the pulse duration of CC, no transfer from 1 to 2 takes place and no comparison of the output signals 1 and 2; in this case, the AND gates 5 and 6 are disabled by the output Q of 10 (FIG. 4), as described later. Accordingly, for sub-critical duration of CC, no counting pulses are applied to the reversible counter 7. Instead, one of two possible constant voltage levels is imposed on the storage section of 2 by unit 13 (FIG. 4) through a second input of 2 connected only to this storage section (a hold-capacitor) so that no error can develop in the accumulation of transitions in counter 7 and only an insignificant error can occur in determining the remainder of the division 'total phase difference divided by $2\pi$' (the error at most may be equal to the function value of the function $V_E (\Delta\phi)$ in FIG. 6 associated with the argument $\Delta\phi_{MIN}$.

The two constant voltages to be imposed on the capacitive storage of 2 in the event of sub-critical CC pulse duration are chosen in accordance with the following considerations:

For very short pulse durations of CC, one has $V_D \approx 0$. If the last measured value was $V_E > K$ ($K = V_{EMAX}/2$), then for $N_N \approx 0$, $(V_E - V_D)$ is also greater than K. This case is indicated by an additional output U of the transient detector 4 which provides a signal corresponding to logical "1". As a result, a constant voltage which, as shown below, is equal to the maximal value of $V_D$ or $V_E$ ($V_{EMAX}$) is imposed on the storage section of 2 by means of unit 13. If the last measured value was $V_E < K$, then the additional output U of the transient detector 4 provides a signal corresponding to logical "0". In this case a voltage corresponding to the minimum value of $V_D$ or $V_E$ (i.e. approximately zero voltage) is imposed on the storage section of 2.

The units 10 to 15 in FIG. 4 perform this function as follows:

Unit 10 consists preferably of a monostable multivibrator which can only be triggered by CC if the pulse duration of CC is greater than a minimal value (corresponding to $\Delta\phi_{MIN}$ in FIG. 6) predetermined by the circuit in 10. If this minimal duration is reached, the output of 10 occurs immediately after the trailing edge of CC. The constant pulse duration of the outputs of 10 is longer than $M_1 + M_2$ but shorter than the signal period T. Unit 10 could also be realized by means of a flip-flop which would be set only if CC were hypercritically long. This flip-flop would be reset by a signal of the sequence control unit 3 (for example the waiting pulse $M_3$) after $M_2$.

Figure 7:
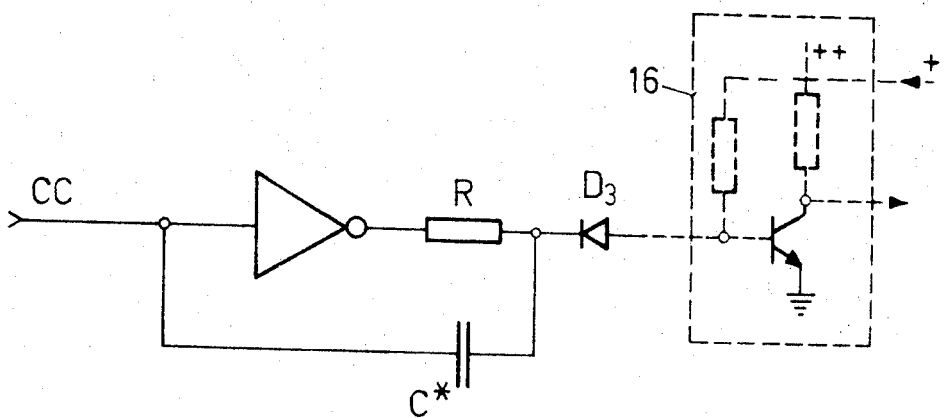
FIG. 7 is the diagram of a circuit for realizing that part of the pulse-duration discriminator 10 in FIG. 4 which determines the critical minimal phase difference $\Delta\phi_{MIN}$.

A possible realization of that part of 10 which determines $\Delta\phi_{MIN}$ is shown in FIG. 7. The pulse CC must last so long (be positive) that the capacitor C* can be sufficiently charged through R in order that the trailing edge of CC is able to trigger the connected circuit 16 (which may be part of a bistable or monostable multivibrator) through diode $D_3$. Only under these conditions the output Q of 10 becomes logical "1" which then enables the AND gates 5 and 6 (FIG. 4) for the duration of the comparison and transfer operation ($M_1 + M_2$).

If CC does not reach the critical minimal value ($\Delta\phi < \Delta\phi_{MIN}$) the continuous signal logical "1" is generated at the complementary output $\bar{Q}$ of 10 (FIG. 4).

The set-reset flip-flop 12 (FIG. 4) obeys the following logical conditions:

b1. set, if 10 $\bar{Q}$ and $M_2$ and U
b2. reset, if 10 Q

It may be remembered that U (additional output of 4) is logical "1" if the last measured $V_E$ value (before CC became sub-critical) was greater than $K = V_{EMAX}/2$, and is logical "0" if this value was less than K.

There are various possible solutions for realizing the conditions b1 and b2, depending on the characteristics of the elements selected. In FIG. 4, a version was illustrated using a flip-flop 12, the inputs of which can be activated by logical "0". In this case, 11 could be a NAND circuit, and the resetting of 12 is achieved by the output $\bar{Q}$ of 10 (which becomes logical "0" if 10 Q is logical "1" so that the above conditions b1 and b2 are satisfied).

A second flip-flop 15 identical to 12 obeys the conditions:

b3. set, if 10 $\bar{Q}$ and $M_2$ and $\bar{U}$
b4. reset, if 10 Q.

Thus a logical negation (U → $\bar{U}$) takes place at the U input of the NAND circuit 14 which otherwise is identically connected as NAND circuit 11.

Accordingly, the flip-flops 12 and 15 can either both be reset, or only one is set at a time and the other is reset (depending on whether U is a logical "1" or "0"). The output signals X, Y are generated at the Q output of 15 and at the $\bar{Q}$ output of 12. Thus the following logic combinations can occur for X, Y.

X = 0, Y = 1 (12 and 15 both reset)
X = 1, Y = 1 (15 set, 12 reset)
X = 0, Y = 0 (12 set, 15 reset)

The outputs X and Y control unit 13 which is an amplitude control unit for the storage section of the sample and hold circuit 2. Unit 13 depends on the characteristics of 2. If it is assumed that, for unit 2 in the regular analog hold state, the output voltage $V_E > K$ decreases slowly as a result of unwanted discharge currents, then the output of 13 ensures that, after the flip-flop 12 has been set, the hold capacitor in the storage section of 2 remains permanently charged to the maximal value (corresponding to the voltage $V_{EMAX}$). If 12 is not set but instead 15, unit 13 causes the hold capacitor to be discharged to a minimal value (corresponding substantially to voltage zero) and to be maintained in this condition.

Figure 8:
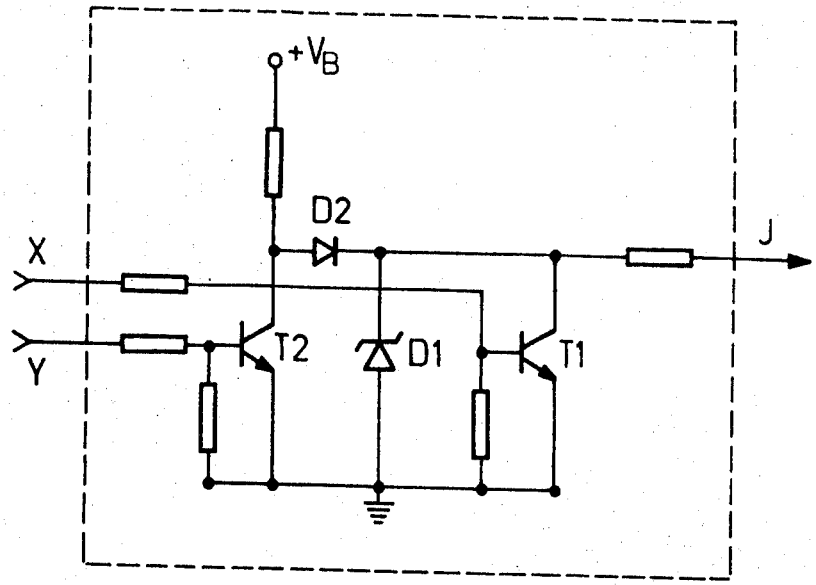
FIG. 8 shows a circuit diagram of the amplitude-control unit 13.

FIG. 8 shows a circuit diagram of the amplitude-control unit 13 which is designed to provide the two desired voltages corresponding to $V_E = V_{EMAX}$ and $V_E \approx O$ respectively.

The transistors $T_1$ and $T_2$, the bases of which are controlled by the two signals X and Y derived from 15 and 12 respectively, work in switching mode, that is to say $T_1$ is closed (conducting) if X is a logical "1", and $T_2$ is closed if Y is a logical "1". The zener voltage $V_{ZD1}$ of the zener diode $D_1$ should be equal to $V_{EMAX}$, where $V_{ZD1}$ should not be lower, but may be somewhat higher than $V_{EMAX}$. The supply voltage $V_B$ should exceed the zener voltage by more than 1V: $V_B > V_{ZD1} + 1V$.

The output J of unit 13 is determined by logic combinations of the signals X and Y in accordance with the following table:

| X | Y | $T_1$ | $T_2$ | Output J |
|---|---|-------|-------|----------|
| 0 | 1 | off   |       | free within the range 0 to $+V_{EMAX}$ |
| 1 | 1 | on    | on    | $\approx 0$ |
| 0 | 0 | off   | off   | $\approx +V_{EMAX}$ |

It should therefore be noted that for the combination X = 0, Y = 1 corresponding to normal operation with hypercritical CC when transfer and comparison takes place, the output J of 13, which is connected to the hold capacitor of 2 (FIG. 4), remains free within the limits 0 to $+V_{EMAX}$, that is to say the voltage $V_E$ transferred from 1 to 2 is influenced as little as possible by the non-activated output of 13.

Figure 9:
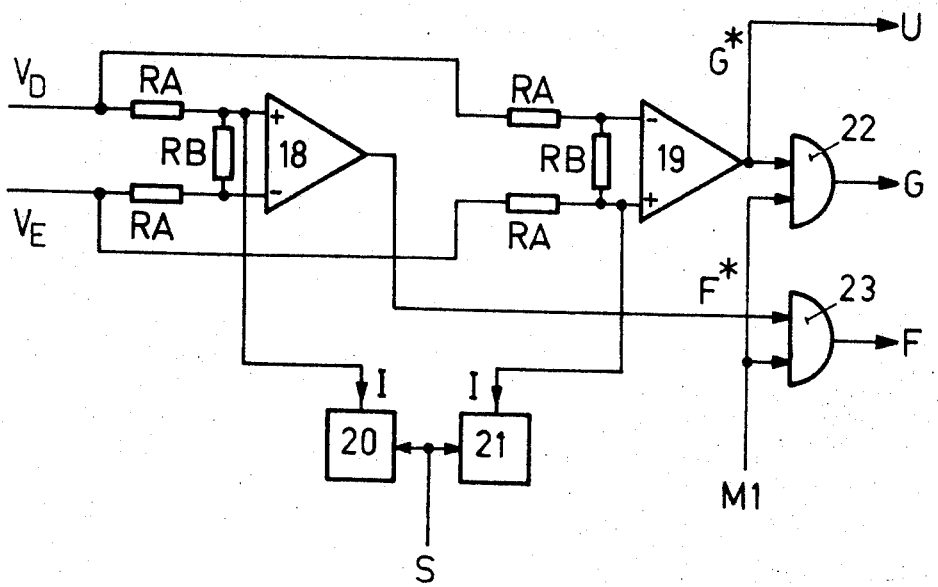
FIG. 9 shows the logic diagram of a possible realization of the transient detector 4.

The function of the units 10 to 15 can be summarized as follows:

If the pulse duration of CC drops below a minimal value corresponding to $\Delta\phi_{MIN}$, the outputs of 10 remain in their stable state. Unit 3 gets triggered nevertheless but in this case $M_1$ and $M_2$ are not passed on to 4 and 2 respectively. The last measured value therefore remains stored in 2, and counter 7 does not receive any counting pulse. If the signal U is logic "1" during $M_2$, the flip-flop 12 is set. This means that the last measured value regularly processed was greater than the threshold value $K = V_{EMAX}/2$. In this case, the output E of 2 is held at the maximal voltage through 13 until a hypercritical pulse duration of CC occurs again. If CC becomes sub-critical after a measured value which was smaller than K, U becomes logic "0", 12 is not set but 15 instead. The output of 2 is retained at the minimal voltage through 13 until a hypercritical CC appears again. Finally, a possible realization of the voltage transient detector 4 will be discussed with reference to FIGS. 9 and 10. In FIG. 9, the units 18 and 19 are voltage comparators, plus indicating the non-inverting input and minus the inverting input. The input resistance of these inputs is assumed to be high in comparison with $R_A$ and $R_B$. The units 20 and 21 are constant current sinks. The constant current I determines the threshold K. The critical value of $V_D - V_E$ is reached when the current through $R_B$ changes sign. From this follows the threshold value $K = |V_D - V_E|$ threshold $\approx R_A \cdot I$. The threshold setting is performed at the common input S of units 20 and 21. If the threshold is exceeded, logic "1" signals appear at the outputs F* or G—depending on the sign of the voltage difference $(V_D - V_E)$. The signals F* and G* should only be generated (see above) if the comparison command $M_1$ is generated; this is achieved with the AND gates 22 and 23 in the manner illustrated. On the other hand, the signal U (which according to the above remarks is necessary for the control of NAND gates 11 and 14 in FIG. 4 during the time with sub-critical pulse duration of the pulses CC) should be available independently of $M_1$ and is taken off directly from the output G* of the comparator 19. It should be remembered that U should be logic "1" if $(V_E - V_D) > K$ and logic "0" if $(V_E - V_D) < K$; therefore the output G* is used.

Figure 10:
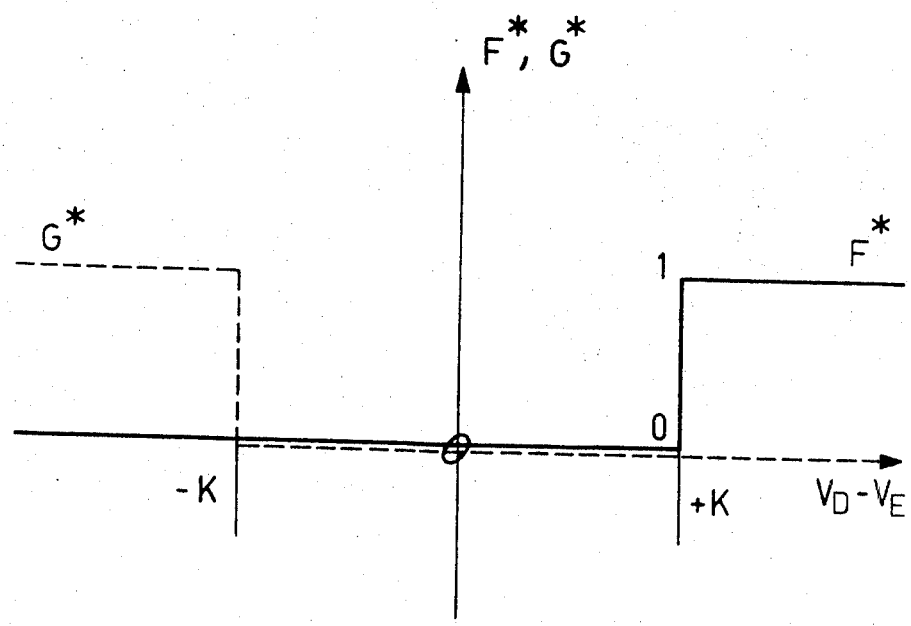
FIG. 10 shows the functional characteristic of the transient detector shown in FIG. 9.

FIG. 10 shows the characteristic of the voltage transient detector of FIG. 9. If the voltage difference $(V_D - V_E)$ becomes greater than K and is positive, then a logical "1" signal appears at the output F*, and when this difference is less than K, then a logical "1" signal appears at the output G*. For $|V_D - V_E| < |K|$ both outputs F* and G* are logic "0".

The proposed method of measuring has a variety of uses; in particular, attention may be called to a current transformer independent of electrical potential (optical coupling) which is the subject matter of another patent application of mine. In this current transformer, the zero-crossings of the current should be represented as accurately as possible. The measuring principle used converts the current measurement into a phase measurement of a high frequency carrier. The use of a phase measuring method wherein the output signal can follow the variations in phase differences with the minimal possible delay is therefore of particular advantage.

I claim:

1. The method for determining the displacement in phase as between two input period signals having essentially the same frequency which comprises the steps of:
   converting each of said input signals into a corresponding rectangular voltage waveform,
   producing from the intervals between homologous edges of said rectangular voltage waveforms a train of duration-modulated rectangular signal pulses corresponding respectively to the difference in phase at a $2\pi$ transition,
   integrating said signal pulses over a predetermined period to form a corresponding amplitude modulated voltage signal and storing said voltage signal,
   periodically sampling the stored voltage signals provided that the duration of said signal pulses exceed a predetermined minimum corresponding to a minimum value of the phase displacement between said input signals and comparing successive sampled values thereof to produce two different series of output signals of opposite sign dependent upon the sense of the difference between compared values of said voltage signals and which exceeds a threshold difference value, and
   counting the output signals of opposite sign.

2. Apparatus for determining the displacement in phase as between two input periodic signals having essentially the same frequency which comprises:
   means converting each of said input signals into a corresponding rectangular voltage waveform,
   means producing from the intervals between homologous edges of said rectangular voltage waveforms a train of duration-modulated rectangular signal pulses corresponding respectively to the difference in phase at a $2\pi$ transition,
   an integrate-and-hold circuit in which the signal pulses in said pulse train are integrated over a predetermined period to form and hold a corresponding amplitude modulated voltage signal,
   a sample-and-hold circuit connected to the output of said integrate-and-hold circuit,
   means controlled in accordance with the duration of said rectangular signal pulses and operative only when the pulse duration exceeds a predetermined minimum corresponding to a minimum value of the phase displacement between said input periodic signals for effecting transfer to and storage of said amplitude modulated voltage signal from the output of said integrate-and-hold circuit in said sample-and-hold circuit,
   a transient detector circuit connected to said sample-and-hold circuit for effecting periodic comparison therein between old and new values of said amplitude modulated signals proportional respectively to the last phase difference stored in said sample-and-hold circuit and a new such signal transferred from the output of said integrate-and-hold circuit, said transient detector producing two different series of output signals of opposite sign respectively dependent upon the sense of any difference between the compared values of said amplitude modulated signals and which exceeds a threshold difference value,
   and a reversible counter into which the output signals of opposite sign from said transient detector are fed and counted.

3. Apparatus as defined in claim 2 wherein said threshold value of the difference between the values of said amplitude modulated signals which are compared in said transient detector circuit equals one-half the highest amplitudes of said amplitude modulated signals which can arise at the output of said integrate-and-hold circuit or at the output of said sample-and-hold circuit for a specific frequency of said periodic input signals.

4. Apparatus as defined in claim 2 wherein the two different series of signals of opposite sign produced at the output of said transient detector are logical signals which are then added in said reversible counter to produce a digital output therefrom and which further includes a digital-to-analog converter connected to said counter for converting the digital output therefrom into analog form, and means for combining the analog converted output of said counter with the analog output from said sample-and-hold circuit.

5. Apparatus as defined in claim 2 and which further includes means forming an additional train of rectangular pulses in which each pulse is initiated by passage of one of said periodic input signals through zero with a delay and terminated by passage of the other periodic input signal through zero, and a sequence control circuit controlled by and operated in accordance with the pulses of said additional pulse train, said sequence control circuit producing a sampling command transmitted to said sample-and-hold circuit, a comparison command transmitted to said transient detector circuit, and a reset command transmitted to said integrate-and-hold circuit.

6. Apparatus as defined in claim 5 wherein said sampling and comparison commands are applied respectively to said sample-and-hold circuit and to said transient detector circuit through respective gating means each of which is controlled jointly by the corresponding command and a further signal derived from the signal pulses of said pulse train and which further signal is indicative of a pulse duration exceeding said predetermined minimum corresponding to the minimum value of the phase displacement between said input periodic signals.

7. Apparatus as defined in claim 2 wherein the signal pulses applied to said integrate-and-hold circuit are constituted by a pulse train in which the pulses are duration modulated in accordance with every other one of the pulses corresponding to the difference in phase of each $2\pi$ transition.

8. Apparatus as defined in claim 2 and which further includes means operable when the duration of said rectangular signal pulses is below the said predetermined minimum corresponding to the minimum value of the phase displacement between said input periodic signals for applying a constant voltage to the storage portion of said sample-and-hold circuit, said constant voltage being equal to the highest possible value of said amplitude modulated voltage signal for the case where the latest value of said voltage signal held in the storage portion of said sample-and-hold circuit is greater than the difference voltage threshold value selected for said transient detector circuit, and said constant voltage being equal to the lowest possible value of said amplitude modulated voltage signal for the case where the latest value of the voltage signal held in the storage portion of said sample-and-hold circuit is less than the difference voltage threshold value selected for said transient detector circuit.

* * * * *